United States Patent [19]

Watanabe

[11] Patent Number: 5,249,193
[45] Date of Patent: Sep. 28, 1993

[54] SOLID-STATE LASER SYSTEM

[75] Inventor: Mitsuyoshi Watanabe, Inazawa, Japan

[73] Assignee: Brother Kogyo Kabushiki Kaisha, Nagoya, Japan

[21] Appl. No.: 853,620

[22] Filed: Mar. 18, 1992

[30] Foreign Application Priority Data

Mar. 20, 1991 [JP] Japan .................................. 3-056799
May 16, 1991 [JP] Japan .................................. 3-111804

[51] Int. Cl.⁵ ............................................ H01S 3/10
[52] U.S. Cl. ........................................ 372/23; 372/22
[58] Field of Search ...................... 372/22, 23, 21, 92, 372/98, 106, 105, 101

[56] References Cited

U.S. PATENT DOCUMENTS

| | | | |
|---|---|---|---|
| 4,791,631 | 12/1991 | Baumert et al. | 372/22 |
| 4,925,263 | 5/1990 | Sandford et al. | 350/96.12 |
| 4,935,931 | 6/1990 | McGraw | 372/18 |
| 5,051,617 | 9/1991 | Normandin et al. | 359/328 |
| 5,060,233 | 10/1991 | Harder et al. | 372/22 |
| 5,164,947 | 11/1992 | Lukas et al. | 372/22 |

FOREIGN PATENT DOCUMENTS 3-138991 10/1989 Japan.

Primary Examiner—James W. Davie
Attorney, Agent, or Firm—Oliff & Berridge

[57] ABSTRACT

A solid-state laser system includes both a second harmonic generating non-linear optical element and a sum frequency generating non-linear optical element disposed in a laser resonator. Both a second harmonic and a sum frequency radiation can be generated simultaneously on the same axis by a single laser resonator, thereby permitting a reduction in the required number of component parts, easy alignment and a compact construction. A first fundamental wave emitted from a semiconductor laser passes through a sum frequency generating non-linear optical element and is absorbed by a solid state laser rod whereby a second fundamental wave is generated. The generated second fundamental wave thus generated resonates in an optical resonator so as to pass through the sum frequency generating non-linear optical-element, second harmonic generating non-linear optical element and solid state laser rod. A portion of the second fundamental wave is then wavelength-converted in the second harmonic generating non-linear optical element, and, a second harmonic is generated. The generated second harmonic passes through an output mirror and is output to the exterior. The first fundamental wave and the second fundamental wave are then mixed together in the sum frequency generating non-linear optical element to generate a sum frequency radiation. The generated sum frequency radiation passes through the solid-state laser rod, second harmonic generating non-linear optical element and output mirror, and is output to the exterior.

23 Claims, 4 Drawing Sheets

SOLID-STATE LASER SYSTEM

BACKGROUND OF THE INVENTION

1. Field of the Invention

The present invention relates to a solid-state laser system and, more particularly, to a solid-state laser system wherein the wavelength of a fundamental wave laser beam generated by a laser medium is converted by means of a non-linear optical element to obtain a higher harmonic frequency.

2. Description of the Related Art

First, an example of a conventional second harmonic generating solid-state laser system will be described below with reference to FIG. 5.

The second harmonic generating solid-state laser comprises a semiconductor laser 51 such as a laser diode (hereinafter referred to as "LD"), a condenser lens 52, a solid-state laser rod 53, a second harmonic generating non-linear optical element 54 (hereinafter referred to as an "SHG element"), and an output mirror 55, all disposed on an optical axis 50. A coating for high reflection of a solid-state laser fundamental wave is applied to the LD 51 side end face of the solid-state laser rod 53, and an optical resonator 56 is constituted in cooperation with the output mirror 55. The solid-state laser rod 53 is excited by an output light beam 501 from the LD 51 and generates a fundamental wave 502. The fundamental wave 502 thus generated resonates so as to pass through the SHG element 54 and is converted into a second harmonic 503. The second harmonic 503 passes through the output mirror 55 and is output to the exterior. For example, if, in this conventional example, Nd:YAG is used as the solid-state laser rod 53 and KTiOPO$_4$ (hereinafter abbreviated to "KTP") is used as the SHG element, then it is possible to obtain as the second harmonic a green laser beam having a wavelength of 532 nm.

Next, an example of a conventional sum frequency generating solid-state laser system will be described below with reference to FIG. 6.

The sum frequency generating solid-state laser system comprises an LD 61 disposed on an optical axis 60, a condenser lens 62, a sum frequency generating non-linear optical element 63 (hereinafter referred to as an "SFG element"), a solid-state laser rod 64, and an output mirror 65. A coating for high reflection of a solid-state laser fundamental wave is applied to the LD 61 side end face of the SFG element 63, and an optical resonator 66 is constituted in cooperation with the output mirror 65. An output light beam 601 from the LD 61 passes through the SFG element 63 and excites the solid-state laser rod 64. A fundamental wave 602 generated from the solid-state laser rod 64 resonates so as to pass through the SFG element 63, and in the SFG element 63 fundamental wave 602 is mixed with the output light beam from the LD 61 to generate a sum frequency radiation 603. The sum frequency radiation 603 passes through the solid-state laser rod 64 and the output mirror 65, and then, is output to the exterior. For example, if in this conventional example Nd:YAG is used as the solid-state laser rod 64 and KTP is used as the SFG element 63, it is possible to obtain as the sum frequency a blue laser beam having a wavelength of 459 nm. The crystallographic axes of the KTP used in the sum frequency generating solid-state laser and of the second harmonic generating KTP, relative to the optical axis, are disposed in such directions as to generate a sum frequency radiation and a second harmonic, respectively.

According to the prior art, however, in the case where both a second harmonic and a sum frequency radiation are required, it is necessary to separately provide a second harmonic generating solid-state laser system and a sum frequency generating solid-state laser system, resulting in an increased number of parts and an increased size of the entire system, thus leading to an increased cost. It has also been necessary to make adjustment for alignment with respect to both the second harmonic generating solid-state laser system and the sum frequency generating solid-state laser system.

SUMMARY OF THE INVENTION

It is an object of the present invention to provide a solid-state laser system of high reliability, which permits reduction in the required number of parts and easy alignment.

According to the present invention, for achieving the aforementioned object and to overcome the above-mentioned problems, in a solid-state laser system wherein the wavelength of a fundamental wave generated by a laser medium is converted by a non-linear optical element to generate a higher harmonic, a laser resonator includes both a second harmonic generating non-linear optical element and a sum frequency generating non-linear optical element.

In the solid-state laser system of the present invention having the above construction, both a second harmonic and a sum frequency radiation are generated simultaneously on the same axis by means of a single laser resonator. In addition, the second harmonic and the sum frequency radiation are independently subjected to an output modulation.

Thus, even if two wavelengths of laser beams are required, it is not necessary to provide both a second harmonic generating solid-state laser system and a sum frequency generating solid-state laser system, unlike the prior art, thus permitting great reduction in the required number of parts and the provision of a compact solid-state laser system of high reliability.

BRIEF DESCRIPTION OF THE DRAWINGS

The invention will be described in detail with reference to the following figures, wherein.

DESCRIPTION OF THE PREFERRED EMBODIMENTS

Embodiments of the present invention will be described hereinunder with reference to the accompanying drawings.

Figure 1:
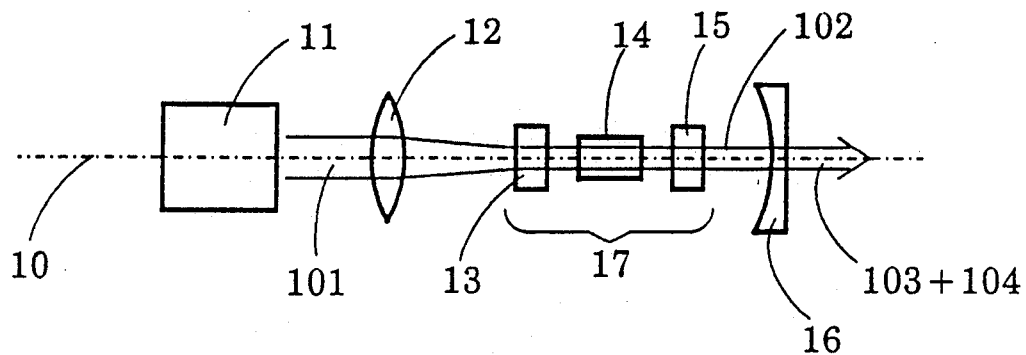
FIG. 1 is a view showing a solid-state laser system in a first embodiment according to the present invention.

Referring first to FIG. 1, there is illustrated a construction of a solid-state laser system in a first embodiment according to the present invention. In this solid-state laser system, an LD 11 is disposed on an optical axis 10, and, successively in the travelling direction of a laser beam generated from the LD 11, there are disposed a condenser lens system 12, a sum frequency generating KTP 13, an Nd:YAG crystal 14, a second harmonic generating KTP 15, and an output mirror 16. A coating comprising a multi-layer of oxide films for diminishing loss of an optical resonator is applied to both end faces of each of the sum frequency generating KTP 13, Nd:YAG crystal 14 and second harmonic generating KTP 15.

This coating provides the following characteristics, provided that the LD 11 side end face and output mirror 16 side end face of each element are assumed to be A and B, respectively. The end face A of the sum frequency generating KTP 13 is highly transmissible for 808 nm and highly reflective for 1064 nm, 459 nm and 532 nm. The end face B of the sum frequency generating KTP 13 and the end face A of the Nd:YAG crystal 14 are highly transmissible for 808 nm, 1064 nm, 459 nm and 532 nm. The end face B of the Nd:YAG crystal 14, and the end faces A and B of the second harmonic generating KTP 15 are highly transmissible for 1064 nm, 459 nm and 532 nm. The output mirror 16 is highly reflective for 1064 nm and highly transmissible for 459 nm and 532 nm. Thus, the end face A of the sum frequency generating KTP 13 and the output mirror 16 are highly reflective for the wavelength of 1064 nm, thus constituting an optical resonator 17. The sum frequency generating KTP 13 and the second harmonic generating KTP 15 are of the same composition, but their crystallographic axis directions relative to the optical axis are different from each other. Their crystallographic axes are disposed in such directions as to generate a sum frequency radiation and a second harmonic, respectively, relative to the optical axis.

Next, the operation of the solid-state laser system in this embodiment will be described below with reference to FIG. 1.

A first fundamental wave 101 (wavelength: 808 nm) generated from the LD 11 is converged by the condenser lens system 12, passes through the sum frequency generating KTP 13, and is absorbed by the Nd:YAG crystal 14. As a result, the Nd:YAG crystal 14 is excited to generate a second fundamental wave 102 (wavelength: 1064 nm). The second fundamental wave 102 thus generated resonates in the optical resonator 17 so as to pass through the sum frequency generating KTP 13, second harmonic generating KTP 15 and Nd:YAG crystal 14. At this time, a part of the second fundamental wave 102 (wavelength: 1064 nm) is wavelength-converted in the second harmonic generating KTP 15, to generate a second harmonic 103 (wavelength: 532 nm). The second harmonic 103 thus generated passes through the output mirror 16 and is output to the exterior.

At the same time, the first fundamental wave 101 (wavelength: 808 nm) and the second fundamental wave 102 (wavelength: 1064 nm) are mixed together in the sum frequency generating KTP 13, to generate a sum frequency radiation 104 (wavelength: 459 nm). The sum frequency radiation 104 thus generated passes through the Nd:YAG crystal 14, second harmonic generating KTP 15 and output mirror 16, and is output to the exterior. More particularly, a green laser beam having a wavelength of 532 nm and a blue laser beam having a wavelength of 459 nm are output simultaneously from the output mirror along the optical axis 10.

Figure 2:
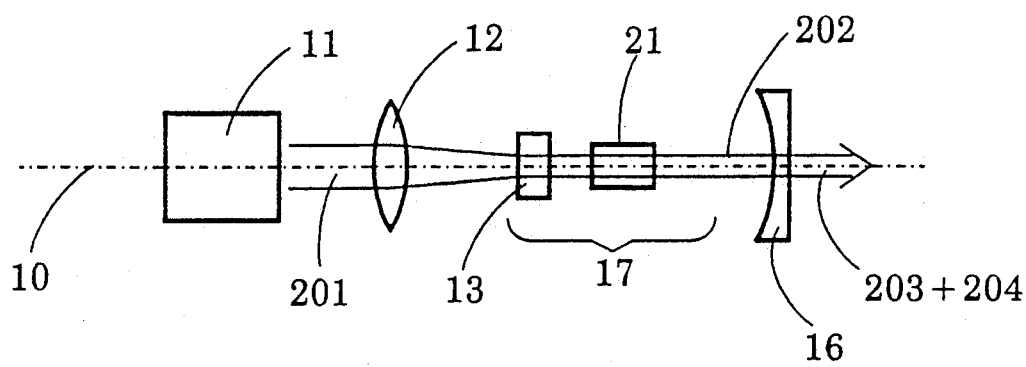
FIG. 2 is a view showing a solid-state laser system in a second embodiment according to the present invention.

A second embodiment according to the present invention will be described below with reference to FIG. 2, in which the same reference numerals as those used in the first embodiment denote the same or corresponding components.

The second embodiment is similar to the first embodiment except that an NYAB crystal 21 is used in place of the Nd:YAG crystal 14 and the second harmonic generating KTP 15 both used in the first embodiment. The NYAB crystal, whose composition is $Nd_xY_{1-x}Al_3(BO_3)_4$; $x = 0.04-0.08$, has both the function of a laser material and that of a non-linear optical element.

The following description is now provided regarding characteristics obtained in the presence of a coating applied to the NYAB crystal 21 and also to other optical elements, provided that the LD side end face and output mirror side end face of each element are assumed to be A and B, respectively, as in the previous embodiment. The end face A of the sum frequency generating KTP 13 is highly transmissible for 804 nm and highly reflective for 1062 nm, 458 nm and 531 nm. The end face B of the sum frequency generating KTP 13 and the end face A of the NYAB crystal 21 are highly transmissible for 804 nm, 1062 nm, 458 nm and 531 nm. The end face B of the NYAB crystal 21 is highly transmissible for 1062 nm, 458 nm and 531 nm. The output mirror 16 is highly reflective for 1062 nm and highly transmissible for 458 nm, 531 nm. Thus, the end face A of the sum frequency generating KTP 13 and the output mirror 16 are highly reflective for the wavelength of 1062 nm, thus constituting an optical resonator 17. In view of the contents of the coating on each optical element, the wavelength of a second harmonic generated by the NYAB crystal is 1062 nm and a peak wavelength of absorption is 804 nm, thus differing slightly from the Nd:YAG crystal, so the values shown are those obtained after modification. Also, as to the phase matching direction of the sum frequency generating KTP 13, it is necessary to modify the phase matching direction to some extent.

The operation of the solid-state laser system in the second embodiment having the above construction will be described below.

A first fundamental wave 201 (wavelength: 804 nm) emitted from the LD 11 is converged by the condenser lens system 12, passes through the sum frequency generating KTP 13, and is absorbed by the NYAB crystal 21. As a result, the NYAB crystal 21 is excited to generate a second fundamental wave 202 (wavelength: 1062). The second fundamental wave 202 thus generated resonates in the optical resonator 17 so as to pass through the sum frequency generating KTP 13 and the NYAB crystal 21. At this time, a portion of the second fundamental wave 202 (wavelength: 1062) is wavelength-converted in the NYAB crystal 21 to generate a second harmonic 203 (wavelength: 531 nm). The second harmonic 203 thus generated passes through the output mirror 16 and is output to the exterior.

At the same time, in the sum frequency generating KTP 13, the first fundamental wave 201 (wavelength: 804 nm) and the second fundamental wave 202 (wavelength: 1062 nm) are mixed together to generate a sum frequency radiation 204 (wavelength: 458 nm), which passes through the NYAB crystal 21 and the output mirror 16 and is output to the exterior. More specifically, like the first embodiment, a green laser beam having a wavelength of 531 nm and a blue laser beam having a wavelength of 458 nm are output simultaneously from the output mirror 16 along the optical axis 10.

A third embodiment of a solid-state laser system according to the present invention will be described below with reference to FIG. 3, in which the same components as in the first and second embodiments are designated by the same reference numerals.

The solid-state laser system of the third embodiment comprises a laser output section 1 and an output control section 2. In the laser output section 1, an LD 11 is disposed on an optical axis 10, and successively in the travelling direction of a laser beam generated from the LD 11 there are disposed a polarization beam splitter (hereinafter abbreviated to "PBS") 32, a condenser lens system 12, a sum frequency generating KTP 13, an Nd:YAG crystal 14, a second harmonic generating KTP 15, and an output mirror 16. For diminishing loss of an optical resonator, a coating comprising a multilayer of oxide films is applied to both end faces of each of the sum frequency generating KTP 13, Nd:YAG crystal 14 and second harmonic generating KTP 15. This coating provides the following characteristics, provided that the LD 11 side end face and output mirror 16 side end face of each element are assumed to be A and B, respectively. The end face A of the sum frequency generating KTP 13 is highly transmissible for 808 nm and highly reflective for 1064 nm, 459 nm and 532 nm. The end face B of the sum frequency generating KTP 13 and the end face A of the Nd:YAG crystal 14 are highly transmissible for 808 nm, 1064 nm, 459 nm and 532 nm. The end face B of the Nd:YAG crystal 14 and the end faces A and B of the second harmonic generating KTP 15 are highly transmissible for 1064 nm, 459 nm and 532 nm. The output mirror 16 is highly reflective for 1064 nm and highly transmissible for 459 nm and 532 nm. Thus, the end face A of the sum frequency generating KTP 13 and the output mirror 16 are highly reflective for the wavelength of 1064 nm, thus constituting an optical resonator 17. The sum frequency generating KTP 13 and the second harmonic generating KTP 15 are of the same compositions but are different in their crystallographic axis directions relative to the optical axis, namely in their directions where phase matching conditions can be satisfied. The output control section 2 comprises an LD driver 41 for oscillation of the LD 11, an LD driver 42 for oscillation of an LD 31, an output controller 43, and an external signal input portion 44.

Figure 3:
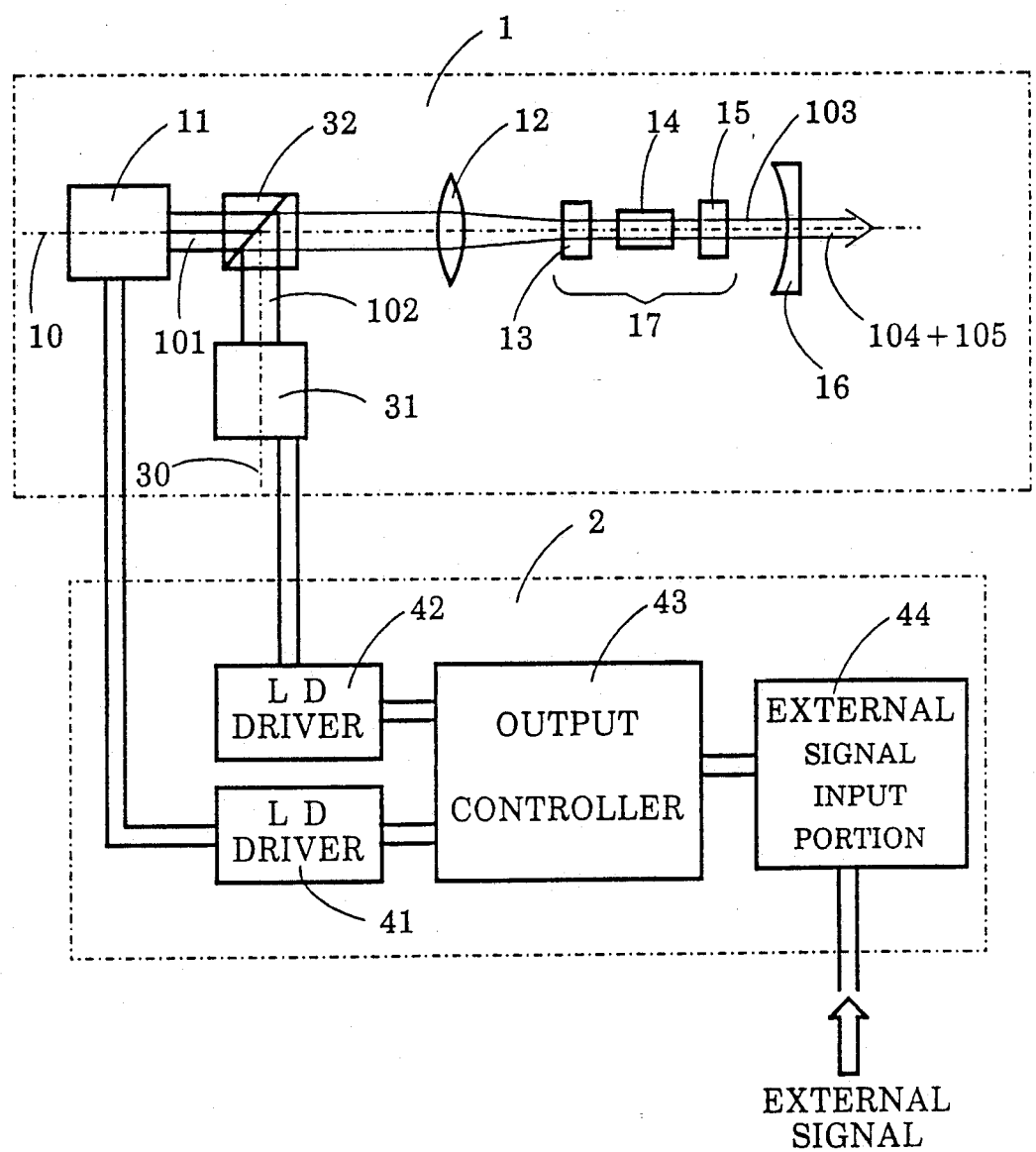
FIG. 3 is a view showing a solid-state laser system in a third embodiment according to the present invention.

With reference to FIG. 3, the following description describes a process where both the second harmonic and the sum frequency radiation are generated simultaneously on the same axis from the laser output section 1 in the solid-state laser system of this third embodiment. Light beams emitted from the LD 11 and from the LD 31 are set as linearly polarized light beams having polarizing directions perpendicular to each other. Consequently, a first fundamental wave 101 (wavelength: 808 nm) generated from the LD 11 passes through the PBS 32, while an excitation light beam 102 (wavelength: 808 nm) generated from the LD 31 is reflected by the PBS 32. Then, both are converged by the condenser lens system 12, pass through the sum frequency generating KTP 13 and are absorbed by the Nd:YAG crystal 14. The Nd:YAG crystal which has absorbed the first fundamental wave 101, and the excitation light beam 102 is thereby excited to generate a second fundamental wave 103 (wavelength: 1064 nm). The second fundamental wave 103 thus generated resonates in the optical resonator 17 so as to pass through the sum frequency generating KTP 13, second harmonic generating KTP 15 and Nd:YAG crystal 14. At this time, a portion of the second fundamental wave 103 is wavelength-converted in the second harmonic generating KTP 15 to generate a second harmonic 104 (wavelength: 532 nm). The second harmonic 104 thus generated passes through the output mirror 16, and is output to the exterior. At the same time, in the sum frequency generating KTP 13, the first and second fundamental waves 101, 103 are mixed together to generate a sum frequency radiation 105 (wavelength: 459 nm). The sum frequency radiation 105 thus generated passes through the solid-state laser rod 14, second harmonic generating KTP 15 and output mirror 16, and is output to the exterior. More specifically, a green laser beam of 532 nm in wavelength and a blue laser beam of 459 nm in wavelength are output simultaneously from the output mirror along the optical axis 10.

The following is a description of modulating the green laser beam as the second harmonic and the blue laser beam as the sum frequency radiation. First, the principle of modulating the second harmonic and the sum frequency radiation independently will be described. The first fundamental wave 101 generated from the LD fulfills both the function of exciting the Nd:YAG crystal 14 and the function of supplying the fundamental wave to the sum frequency generating KTP 13. On the other hand, the excitation light beam 102 emitted from the LD 31 is used only for exciting the Nd:YAG crystal 14 because of a difference from the polarizing direction where the phase matching conditions are satisfied in the sum frequency generating KTP 13, and it does not make any contribution as the first fundamental wave. Therefore, when the LD 11 does not emit light, the Nd:YAG crystal 14 is excited by only the excitation light beam 102 emitted from the LD 31. In this case, the sum frequency radiation 105 is not generated although the second harmonic 104 is generated. Thus, the polarizing direction of the first fundamental wave in the sum frequency generating KTP 13 has a direct influence on the conversion efficiency to the sum frequency radiation. By utilizing this point, the ratio between the output values of light beams emitted from the LD's 11, 31 is changed and set at a suitable value to modulate the second harmonic output value and the sum frequency radiation output value independently. A brief explanation will now be provided for the calculation of the output values set for the LD 11 and LD 31. In the case where the output value of the first fundamental wave 101 is $P_1$, that of the excitation light beam 102 is $P_2$ and the oscillation threshold value of the Nd:YAG laser is Pth, the output value of the second harmonic 104 and that of the sum frequency radiation 105 are assumed to be G and B, respectively. The output value G of the second harmonic 104 is proportional to a square of the output value of the second fundamental wave 103 in the optical resonator 17, and the output value of the second fundamental wave 103 is proportional to a value obtained by subtracting the oscillation threshold value Pth from the sum of the output value $P_1$ of the first fundamental wave 101 and the output value $P_2$ of the excitation light beam 102. This is simply expressed by the following equation (1):

$$G = g(P_1 + P_2 - Pth)^2 \qquad (1)$$

The output value B of the sum frequency radiation 105 is proportional to the product of the output value of the second fundamental wave 103 in the optical resonator 17 and the output value Pl of the first fundamental wave 101, and the output value of the second fundamental wave 103 is proportional to a value obtained by subtracting the oscillation threshold value Pth from the sum of the output value $P_1$ of the first fundamental wave 101 and the output value $P_2$ of the excitation light beam 102. This is simply expressed by the following equation (2):

$$B = bP_1(P_1 + P_2 - Pth) \qquad (2)$$

In the above equations, (g) and (b) are coefficients each including a solid-state laser gain, a resonator loss and a non-linear optical constant, and the losses induced by conversion of the first and second fundamental waves into the second harmonic and sum frequency radiation are ignored because they are very small in comparison with the entire output value. By solving the equations (1) and (2) for $P_1$ and $P_2$, the following two equations result:

$$P_1 = B/b(g/G)^{\frac{1}{2}} \qquad (3)$$

$$P_2 = (G/g)^{\frac{1}{2}} - B/b(g/G)^{\frac{1}{2}} + Pth \qquad (4)$$

That is, once the second harmonic output value G and the sum frequency output value B are set, it is possible to calculate required values of the first fundamental wave output value $P_1$ and excitation light output value $P_2$, using the equations (3) and (4). However, since $P_2$ is a positive value, it is necessary to satisfy the condition of the following expression (5) in order to have a solution of $P_1$:

$$(G/g)^{\frac{1}{2}} - B/b(g/G)^{\frac{1}{2}} + Pth > 0 \qquad (5)$$

Thus, by setting the first fundamental wave output value $P_1$ and the excitation light output value $P_2$ to appropriate values, it is made possible to modulate the second harmonic output value G and the sum frequency radiation output value B independently.

In this embodiment, information of the second harmonic output value G and information of the sum frequency radiation output value B are input into the external signal input portion 44. The output controller 43 receives a signal from the external signal input portion 44 and determines the output values of the LD 11 and LD 31 so as to satisfy the equations (3) and (4). Furthermore, the output controller 43 sets driving current values proportional to the thus-determined output values of the LD 11 and LD 31 and provides them to the LD drivers 41 and 42. Each of the LD drivers 41 and 42 is provided with an automatic power control (APC) circuit, and can thereby control the output values of the LD 11 and LD 31 to be stable output values in accordance with the command given from the output controller 43. Since each of the LD drivers 41 and 42 is provided with an automatic temperature control (ATC) circuit, it is possible to set generated wavelengths to appropriate values by temperature control.

Figure 4:
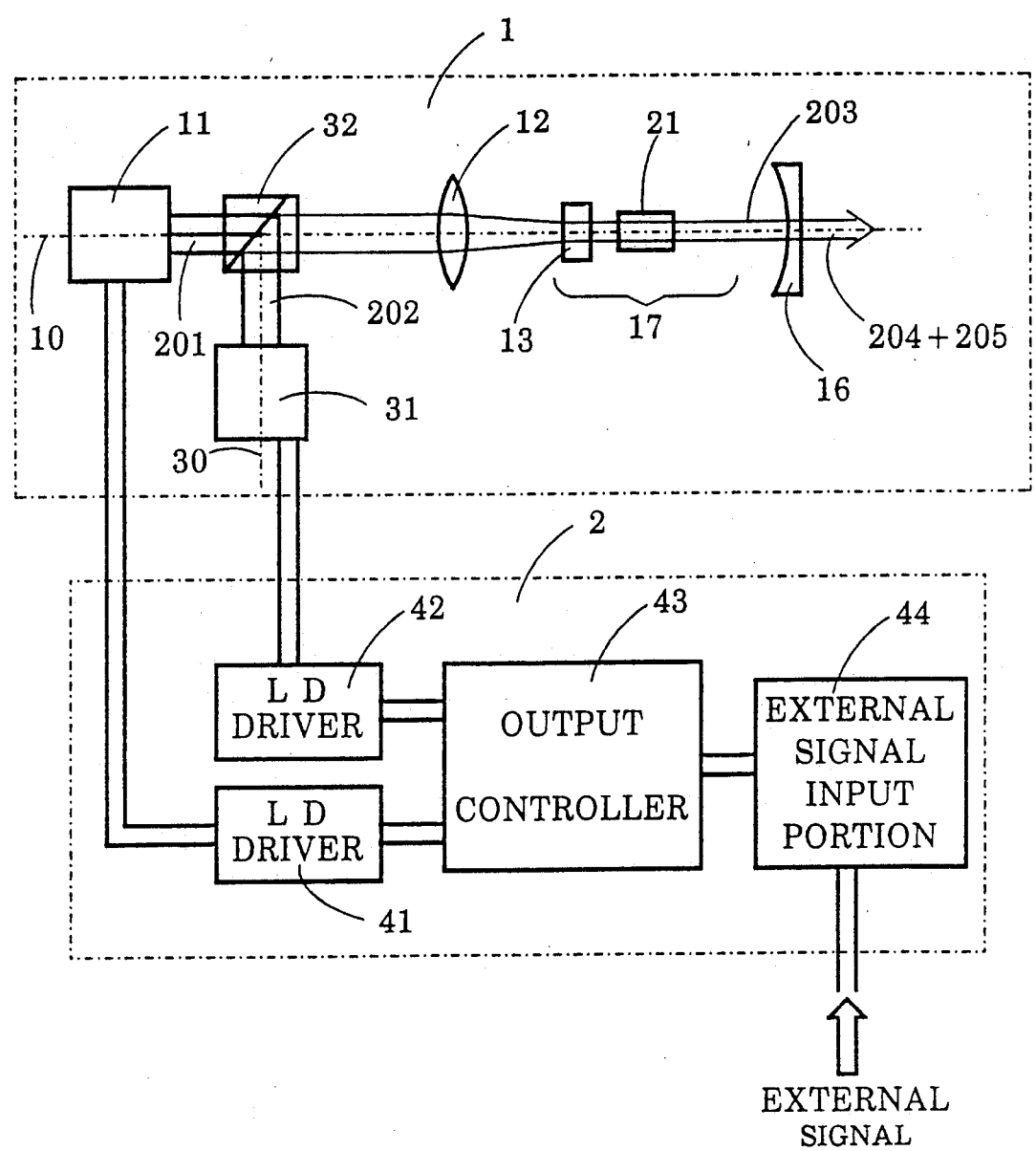
FIG. 4 is a view showing a solid-state laser system in a fourth embodiment according to the present invention.
Figure 5:
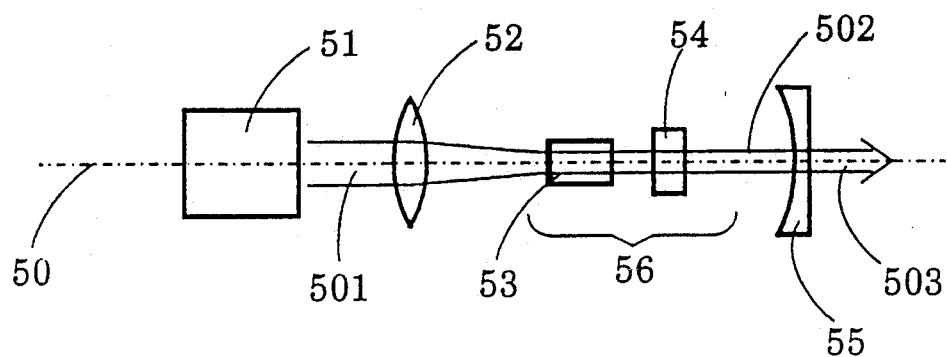
FIG. 5 is a view showing a conventional second harmonic generating solid-state laser system.
Figure 6:
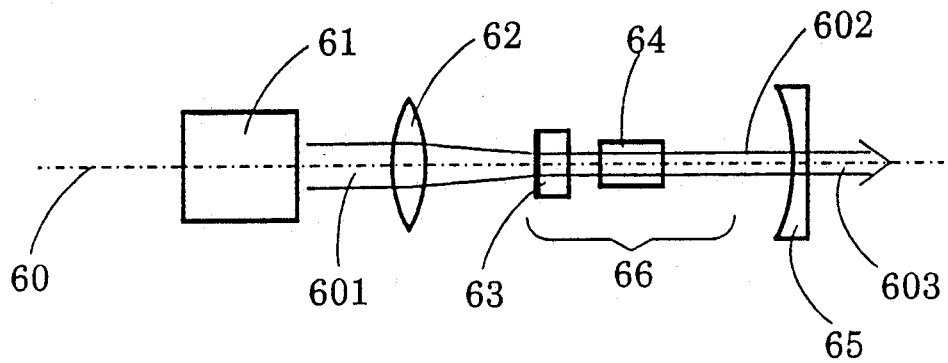
FIG. 6 is a view showing a conventional sum frequency generating solid-state laser system.

A fourth embodiment will now be described with reference to FIG. 4, in which the components common to those in FIG. 3 are denoted by the same reference numerals. The fourth embodiment is similar to the third embodiment except that an NYAB crystal 21 is used in place of the Nd:YAG crystal 14 and the second harmonic generating KTP 15 both used in the third embodiment. The NYAB crystal, whose composition is $Nd_xY_{1-x}Al_3(BO_3)_4$; $x = 0.04$–$0.08$, has both the function of a laser material and the function of a non-linear optical element. A coating is applied to each of the NYAB crystal 21 and other optical elements. This coating provides the following characteristics, provided that the LD side end face and output mirror side end face of each element are assumed to be A and B, respectively, as in the third embodiment. The end face A of the sum frequency generating KTP 13 is highly transmissible for 804 nm and highly reflective for 1062 nm, 458 nm, 531 nm. The end face B of the sum frequency generating KTP 13 and the end face A of the NYAB crystal 21 are highly transmissible for 804 nm, 1062 nm, 458 nm, 531 nm. The end face B of the NYAB crystal 21 is highly transmissible for 1062 nm, 458 nm, 531 nm. The Output mirror 16 is highly reflective for 1062 nm and highly transmissible for 458 nm, 531 nm. Thus, the end face A of the sum frequency generating KTP 13 and the output mirror 16 are reflective for the wavelength of 1062 nm, thus constituting an optical resonator 17. A coating is applied to each of the optical elements, providing the following characteristics. The wavelength of the second fundamental wave generated from the NYAB crystal 21 is 1062 nm and a peak wavelength of absorption is 804 nm, which slightly differ from the values obtained in the use of Nd:YAG crystal, so the values are those obtained after modification. Also, as to the phase matching direction of the sum frequency generating KTP 13, it is necessary to modify the phase matching direction to some extent.

The operation of the solid-state laser system of this fourth embodiment will be described below.

A first fundamental wave 201 (wavelength: 804 nm) emitted from the LD 11 passes through the PBS 32, and an excitation light beam 202 (wavelength: 804 nm) emitted from the LD 31 is reflected by the PBS 32. Both are then converged by the condenser lens system 12, pass through the sum frequency generating KTP 13, and are absorbed by the NYAB crystal 21. As a result, the NYAB crystal 21 is excited to generate a second fundamental wave 203 (wavelength: 1062 nm). The second fundamental wave 203 thus generated resonates in the optical resonator 17 so as to pass through the sum frequency generating KTP 13 and the NYAB crystal 21. At this time, a part of the second fundamental wave 203 is wavelength-converted in the NYAB crystal 21 to generate a second harmonic 204 (wavelength: 531 nm). The second harmonic 204 thus generated passes through the output mirror 16, and is output to the exterior. At the same time, the first and second fundamental waves 201, 203 are mixed together in the sum frequency generating KTP 13 to generate a sum frequency radiation 205. The sum frequency radiation 205 thus generated passes through the NYAB crystal 21 and the output mirror 16, and is output to the exterior. More specifically, as in the first embodiment, a green laser beam of 531 nm in wavelength and a blue laser beam of 458 nm in wavelength are output simultaneously from the output mirror 16 along the optical axis 10. The output control section 2 and the modulation of output values in the fourth embodiment are the same as in the third embodiment.

It goes without saying that various modifications may be made within the scope not departing from the gist of the present invention.

For example, although in the first embodiment there is used a Nd:YAG crystal as a solid-state laser material, there may be used other solid-state laser materials, e.g., Nd:YVO$_4$ crystal. Moreover, although in the first embodiment there is used KTP as the material of the second harmonic generating non-linear optical element and that of the sum frequency generating non-linear optical element, there may be used any other suitable non-linear optical material such as KNbO$_3$ and an organic non-linear optical material. Other materials may be used for the second harmonic generating non-linear optical element and the sum frequency generating non-linear optical element, respectively.

In the solid-state laser system according to the present invention, as will be apparent from the above description, both a second harmonic and a sum frequency radiation can be generated simultaneously on the same axis by means of a single laser resonator, and their output values can be modulated independently. Therefore, even in the case where two wavelengths of laser beams are required, it is not necessary to provide both a second harmonic generating solid-state laser system and a sum frequency generating solid-state laser system, unlike the prior art. Consequently, the number of components required can be decreased to a great extent, and it is possible to provide a compact solid-state laser system of high reliability.

What is claimed is:

1. A solid-state laser system, comprising:
   a laser medium which generates a fundamental wave having a wavelength;
   a laser resonator having an optical axis; and
   a non-linear optical element which converts said wavelength to generate a harmonic higher than said fundamental wave in said laser resonator, said non-linear optical element comprising:
   a second harmonic generating non-linear optical element disposed in the laser resonator for generating a second harmonic; and
   a sum frequency generating non-linear optical element disposed in the laser resonator for generating a sum frequency radiation;
   wherein the second harmonic and the sum frequency radiation are generated simultaneously on said optical axis of the laser resonator.

2. A solid-state laser system, comprising:
   a laser medium for generating a fundamental wave having a wavelength;
   a laser resonator having an optical axis;
   a non-linear optical element for converting said wavelength to generate a harmonic higher than said fundamental wave in said laser resonator, said non-linear optical element comprising: a second harmonic generating non-linear optical element disposed in the laser resonator for generating a second harmonic; and a sum frequency generating non-linear optical element disposed in the laser resonator for generating a sum frequency radiation;
   a first light source for emitting a first laser beam which excites the laser medium, said first laser beam being linearly polarized;
   a second light source for emitting a second laser beam, which excites the laser medium, said second laser beam being linearly polarized, a polarizing direction of said second laser beam being substantially perpendicular to a polarizing direction of said first laser beam; and
   output control means for controlling an output value of said first light source and an output value of said second light source;
   wherein the second harmonic and the sum frequency radiation are generated simultaneously, said output control means controlling the output values of said second harmonic and said sum frequency radiation.

3. A solid-state laser system, comprising:
   a light source for emitting a first laser beam;
   a laser medium for generating a fundamental laser beam, the laser medium being excited by said light source;
   a sum frequency generating non-linear optical element for generating a sum frequency radiation from said first laser beam and said fundamental laser beam, said sum frequency generating non-linear optical element being disposed between said light source and said laser medium, said sum frequency generating non-linear optical element having an end face facing said light source, said end face having a coating which is capable of transmitting the first laser beam and reflecting the fundamental laser beam;
   a second harmonic generating non-linear optical element for generating a second harmonic from the fundamental laser beam, said second harmonic generating non-linear optical element being disposed on a side of said laser medium, said side of said laser medium being opposite to said light source; and
   an output mirror capable of reflecting the fundamental laser beam and capable of transmitting the sum frequency radiation and said second harmonic, the output mirror being disposed on a side of said second harmonic generating non-linear optical element, said side of said second harmonic generating non-linear optical element being opposite to said laser medium;
   wherein when the laser medium generates the fundamental laser beam, the fundamental laser beam resonates between the sum frequency generating non-linear optical element and the output mirror, the second harmonic generating non-linear optical element generates the second harmonic from said fundamental laser beam, the sum frequency generating non-linear optical element generates the sum frequency radiation from both of the first laser beam and the fundamental laser beam, and the output mirror transmits said sum frequency radiation and said second harmonic.

4. The solid-state laser system as claimed in claim 3, wherein said light source comprises a semiconductor laser.

5. The solid-state laser system as claimed in claim 4, further comprising a condenser lens disposed between said light source and laser medium.

6. The solid-state laser system as claimed in claim 5, wherein said laser medium comprises Nd:YVO$_4$ crystal.

7. The solid-state laser system as claimed in claim 6, wherein said sum frequency generating non-linear optical element and said second harmonic generating non-linear optical element comprise $KTiOPO_4$.

8. The solid-state laser system as claimed in claim 7, wherein said $Nd:YVO_4$ crystal comprises a coating which reflects said first laser beam, the coating being disposed at an end face of said $Nd:YVO_4$ crystal in a travelling direction of the fundamental laser beam such that the coating faces the output mirror.

9. The solid-state laser system as claimed in claim 8, wherein said second harmonic generating non-linear optical element comprises coatings which are provided at two end faces of said second harmonic generating non-linear optical element, said coatings transmitting said sum frequency radiation, said second harmonic and first laser beam.

10. The solid-state laser system as claimed in claim 9, wherein said second harmonic comprises a green laser beam and said sum frequency radiation comprises a blue laser beam.

11. The solid-state laser system as claimed in claim 3, wherein said second harmonic generating non-linear optical element and said laser medium are formed with a single unit of NYAB crystal, the NYAB crystal generates the fundamental laser beam to be excited by the first laser beam and then generates a second harmonic from the fundamental laser beam, a sum frequency generating non-linear optical element generates a sum frequency radiation from both of the first laser beam and the fundamental laser beam, and the output mirror transmits said sum frequency radiation and said second harmonic.

12. A solid-state laser system, comprising:
a laser medium generating a fundamental wave having a wavelength;
a first light source for emitting a first laser beam polarized linearly;
a second light source for emitting a second laser beam polarized linearly, said second laser beam having a polarizing direction different than a polarizing direction of said first laser beam;
mixing means for mixing said first laser beam and said second laser beam on a predetermined optical axis;
a laser medium for generating a fundamental laser beam to be excited by said first and second laser beams;
a sum frequency generating non-linear optical element for generating a sum frequency radiation from said first laser beam and said fundamental laser beam, said sum frequency generating non-linear optical element being disposed between said mixing means and laser medium, said sum frequency generating non-linear optical element having a coating at an end face of a light source side of said sum frequency generating non-linear optical element, the coating transmitting the first and second laser beams and reflecting the fundamental laser beam, said sum frequency generating non-linear optical element having a crystallographic axis direction which does not satisfy phase matching conditions against the polarizing direction of the second laser beam;
a second harmonic generating non-linear optical element for generating a second harmonic from the fundamental laser beam, said second harmonic generating non-linear optical element being disposed to a side of said laser medium, said laser medium side being opposite to said light source; and
an output mirror for reflecting the fundamental laser beam and for transmitting said sum frequency radiation and said second harmonic, the output mirror being disposed on a side of said second harmonic generating non-linear optical element, said side of said second harmonic generating non-linear optical element being opposite to said laser medium;
wherein when the first and second light sources emit the first and second laser beams, the laser medium generates said fundamental laser beam, the second harmonic generating non-linear optical element generates the second harmonic from said fundamental laser beam, the sum frequency generating non-linear optical element generates the sum frequency radiation from the first laser beam and the fundamental laser beam, and the output mirror transmits said sum frequency radiation and said second harmonic.

13. The solid-state laser system as claimed in claim 12, further comprising output control means for controlling output values of said first laser beam generated from said first light source and said second laser beam generated from said second light source, wherein the second harmonic and the sum frequency radiation are generated simultaneously, said output control means controlling the second harmonic and the sum frequency radiation.

14. The solid-state laser system as claimed in claim 12, wherein said second laser beam has a polarizing direction perpendicular to a polarizing direction of said first laser beam.

15. The solid-state laser system as claimed in claim 12, wherein said first and second light sources comprise semiconductor lasers.

16. The solid-state laser system as claimed in claim 15, further comprising a condenser lens disposed between said first and second light sources and said laser medium.

17. The solid-state laser system as claimed in claim 16, wherein said laser medium comprises $Nd:YVO_4$ crystal.

18. The solid-state laser system as claimed in claim 17, wherein said sum frequency generating non-linear optical element and said second harmonic generating non-linear optical element comprise $KTiOPO_4$.

19. The solid-state laser system as claimed in claim 18, wherein said $Nd:YVO_4$ crystal comprises a coating which reflects said first laser beam, the coating being disposed at an end face of said $Nd:YVO_4$ crystal in a travelling direction of the fundamental laser beam such that the coating faces the output mirror.

20. The solid-state laser system as claimed in claim 12, wherein said second harmonic generating nonlinear optical element and said laser medium are formed with a single unit of NYAB crystal, the NYAB crystal generates the fundamental laser beam to be excited by the first and second laser beams and then generates a second harmonic from the fundamental laser beam, a sum frequency generating non-linear optical element generates a sum frequency radiation from said first and second laser beams and the fundamental laser beam, and the output mirror transmits said sum frequency radiation and said second harmonic.

21. The solid-state laser system as claimed in claim 20, wherein said first and second light sources comprise semiconductor lasers.

22. The solid-state laser system as claimed in claim 21, further comprising a condenser lens disposed between said first and second light sources and said laser medium.

23. The solid-state laser system as claimed in claim 22, wherein said sum frequency generating non-linear optical element comprises $KTiOPO_4$.

* * * * *